US011916876B2

(12) United States Patent
St. Pierre

(10) Patent No.: US 11,916,876 B2
(45) Date of Patent: *Feb. 27, 2024

(54) NETWORK MONITORING WITH DIFFERENTIATED TREATMENT OF AUTHENTICATED NETWORK TRAFFIC

(71) Applicant: Arbor Networks, Inc., Westford, MA (US)

(72) Inventor: Brian St. Pierre, Acworth, NH (US)

(73) Assignee: Arbor Networks, Inc., Westford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/327,388

(22) Filed: Jun. 1, 2023

(65) Prior Publication Data
US 2023/0308416 A1 Sep. 28, 2023

Related U.S. Application Data

(63) Continuation of application No. 16/431,418, filed on Jun. 4, 2019, now Pat. No. 11,700,233.

(51) Int. Cl.
*H04L 9/40* (2022.01)
*H04L 69/22* (2022.01)
*H04L 43/08* (2022.01)
*H04L 61/5007* (2022.01)

(52) U.S. Cl.
CPC .......... *H04L 63/0236* (2013.01); *H04L 43/08* (2013.01); *H04L 61/5007* (2022.05); *H04L 63/1425* (2013.01); *H04L 69/22* (2013.01)

(58) Field of Classification Search
CPC ... H04L 43/026; H04L 43/08; H04L 43/0876; H04L 45/00; H04L 61/2007; H04L 63/0236; H04L 63/1425; H04L 69/22
See application file for complete search history.

(56) References Cited

U.S. PATENT DOCUMENTS

| | | | | |
|---|---|---|---|---|
| 9,252,972 | B1 * | 2/2016 | Dukes | H04L 49/70 |
| 2001/0039623 | A1 * | 11/2001 | Ishikawa | H04L 63/1408 |
| | | | | 726/23 |
| 2007/0110069 | A1 * | 5/2007 | Lim | H04L 63/1416 |
| | | | | 370/392 |
| 2010/0218254 | A1 * | 8/2010 | Gray, II | H04L 63/1408 |
| | | | | 726/23 |

(Continued)

*Primary Examiner* — Chris Parry
*Assistant Examiner* — Dixon F Dabipi
(74) *Attorney, Agent, or Firm* — Foley & Lardner LLP

(57) ABSTRACT

A method includes selecting one or more green addresses, each being a different IP address from a block of IP addresses, associating the green addresses with the IP address of the server, and receiving a packet from a client directed to an IP address of the block of IP addresses. It is determined whether the destination address matches the one or more green addresses or is a yellow address. When determined that the destination address matches the one or more green addresses, the packet is sent to the IP address associated with the matching green address, bypassing any DPI. Otherwise, the packet is sent to a scrubber to analyze the packet using DPI and handle the packet or perform a redirection of the client. The redirection causes subsequent requests from the client to be sent to the IP address associated with the green address, bypassing any DPI.

20 Claims, 5 Drawing Sheets

(56) References Cited

U.S. PATENT DOCUMENTS

| | | | |
|---|---|---|---|
| 2014/0149192 A1* | 5/2014 | Bitran | G06Q 30/0241 |
| | | | 705/14.4 |
| 2016/0164896 A1* | 6/2016 | Baldonado | H04L 63/1458 |
| | | | 726/23 |
| 2017/0339186 A1* | 11/2017 | Gurvich | H04L 61/5007 |
| 2017/0366577 A1* | 12/2017 | Shapira | H04L 63/1458 |
| 2018/0020016 A1* | 1/2018 | Hu | H04L 63/1408 |
| 2020/0153856 A1* | 5/2020 | Nainar | H04L 63/1458 |
| 2020/0293210 A1* | 9/2020 | McBrearty | G06F 3/067 |

* cited by examiner

NETWORK MONITORING WITH DIFFERENTIATED TREATMENT OF AUTHENTICATED NETWORK TRAFFIC

CROSS-REFERENCE TO RELATED PATENT APPLICATIONS

This application claims the benefit of priority as a continuation to U.S. patent application Ser. No. 16/431,418, filed Jun. 4, 2019, the entirety of which is incorporated by reference herein.

FIELD OF THE INVENTION

The present technology relates network traffic monitoring, and more particularly to network traffic monitoring with differentiated treatment of authenticated traffic.

BACKGROUND

Network traffic monitoring can include deep packet inspection (DPI) of packets included in network traffic to detect packets associated with a network attack. DPI consumes computing and time resources, adding latency to traffic. Under some circumstances, inspection of all network traffic can be a waste of processing resources and add unnecessary latency to the network traffic.

Such conventional methods and systems have generally been considered satisfactory for their intended purpose. However, there is still a need in the art for a method to inspect network traffic while avoiding, under certain circumstances, waste of processing resources or addition of unnecessary latency.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof: as well as from the appended drawings. To achieve these and other advantages and in accordance with the purpose of the illustrated embodiments, in one aspect, disclosed is a system and computer-implemented method for monitoring network traffic of a protected network using a block of internet protocol (IP) addresses including an IP address for a server. The system and method include selecting one or more green addresses, wherein each green address is a different IP address from the block of IP addresses, associating the one or more green addresses with the IP address of the server, and receiving a packet of the internet traffic from a client directed to an IP address of the block of IP addresses. The packet includes a source address for the client and a destination address from the block of IP addresses, wherein the packet is received prior to any performance of deep packet inspection (DPI) on the packet in association with monitoring the network traffic for the protected network. The system and method further includes determining whether the destination address matches the one or more green addresses or is a yellow address, wherein the yellow address belongs to the block of IP addresses, but is not a green address. When the determination is that the destination address matches the one or more green addresses, the system and method includes sending the packet to the IP address associated with the matching green address, bypassing any deep packet inspection. When the determination is that the destination address does not match the one or more green addresses, the system and method include sending the packet to a scrubber to analyze the packet using deep packet inspection and handle the packet and perform a redirection of the client as a function of a determination made using the DPI. The redirection causes subsequent requests from the client to be sent to the IP address associated with the green address, bypassing any deep packet inspection.

In accordance with another aspect of the disclosure, a system and computerized method is provided for monitoring network traffic for a protected network using a block of IP addresses including an IP address for a server. The method includes receiving a packet of the internet traffic from a router. The packet includes a source address for a client that sent the packet and a destination address from the block of IP addresses, the router has determined that the destination address does not match one or more green addresses, and each green address is a different IP address selected from the block of IP addresses. The method further includes performing DPI on the received packet and determining how to handle the packet and whether to redirect the client to a green address of the one or more green addresses, wherein the determination is a function of the DPI. The redirection causes subsequent requests from the client to be sent to an IP address associated with the green address, bypassing any deep packet inspection. The method further includes handling the packet or redirection of the client in accordance with the determination.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

A system and method are provided for monitoring network traffic that is directed to a protected network, wherein the protected network uses a specified block of internet protocol (IP) addresses, and an IP address included in the block of IP addresses is designated for a server of the protected network. A monitoring system can include a router and a scrubber. The router uses a green path for packets having a green address substituted for their destination address, wherein the green path circumvents deep packet inspection (DPI) by the scrubber. Packets sent via the green path arrive at the server. These packets originally had the server's address, designated as a yellow address, indicated by their destination address. The router directs packets having yellow addresses for their destination address via a yellow path to the scrubber.

The scrubber performs DPI on packets that it receives, and based on the DPI decides whether the packet can be authenticated as being safe and sent from an authenticated or safe source. Once authenticated, the scrubber redirects the client identified by the packet's source address. The redirection causes all future packets sent by the client to use the green address instead of the yellow address so that these packets will be sent by the router along the green path, circumventing DPI by the scrubber.

However, if the scrubber determines based on the DPI that the packet is not legitimate (e.g., is unsafe or malicious) or comes from an illegitimate source, the packet is dropped or quarantined. Additionally, if the scrubber deems the packet as being unknown, meaning it cannot authenticate or deem illegitimate the packet or the client, the packet is forwarded to the protected network to allow the packet to be delivered to its destination. Redirection is not performed.

Figure 1:
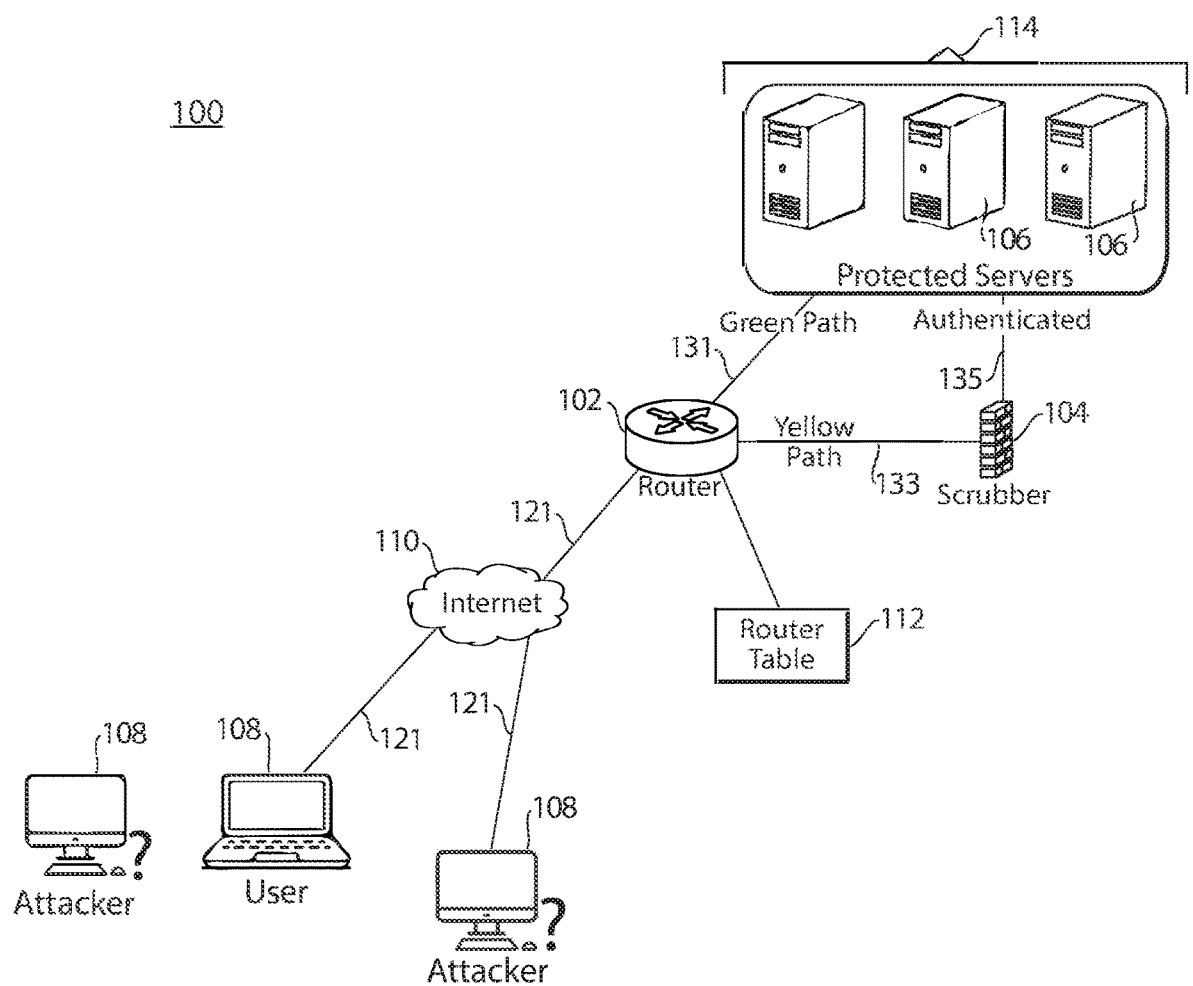
FIG. 1 illustrates a block diagram of an example network monitoring system in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof: are provided in FIGS. 2-5, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes a router 102 and a scrubber 104 that monitor traffic to protected servers 106 of a protected network 114. The router 102 and scrubber 104 can monitor traffic that is received via a network 110 and directed to the protected servers 106. Although FIG. 1 shows one router 102 and one scrubber 104, each of router 102 and scrubber 104 can represent multiple devices. The traffic can be sent by external clients 108 that can be legitimate, or malicious users, or undecided whether legitimate or malicious. Some non-limiting examples of external clients 108 can include servers, mobile devices, desktop computers, microcomputers, and microprocessors.

Router 102 and scrubber 104 can monitor traffic to a unique block of IP addresses assigned to one or more respective protected servers 106, Router 102 and scrubber 104 can be individual computing devices or can be modules of the same computing device. The computing device(s) can each be a physical device or a virtual device that operates on a physical machine at a remote location. The router 102 and scrubber 104 can be disposed at the same physical location or can be remote from one another. Each of the router 102 and scrubber 104 can be provided within or at the edge of the protected network 114 that protects the protected servers 106, in a public network, and/or can be deployed as a cloud-based server accessible via a network, such as the Internet, a public network, or a private network. Examples of protected network 114 include corporations that have multiple corporate offices, a university that can have multiple buildings and/or campuses, or a home network. The protected network 114 can include, for example, a local access network (LAN), a wide access area network (WAN), and/or a VPN. In an example, without limitation, router 102 could include ASR-9000, by Cisco®, and scrubber 104 could include TMS-2600, TMS-2800, TMS-HD 1000 or virtual TMS by Arbor®; The monitoring system 100 can monitor traffic that uses, for example, IPv6 or IPv4. IPv6 provides advantages in which the block of addresses monitored by the monitoring system 100 can be a large block of addresses, making it more difficult for an intruder or computer with malicious intent to guess the green addresses being used. For example, a /96 block provides about four billion possible IP addresses.

Network 110 can include an external network that is unprotected by router 102 and scrubber 104, wherein the external network can include one or more networks, such as the Internet.

Protected servers 106 can provide a service that can be used by subscribing or non-subscribing clients, such as external clients 108. Examples of services include load balancing, archiving, social media service, searching (e.g., by a search engine), etc. A client of the service can be authenticated, such as, without limitation, by determining, whether they are subscribed (when required), determining whether they are provided on a white list, determining whether they are not provided on a black list, or via application of available heuristics.

Each protected server 106 can represent multiple servers of the protected network 114. The protected servers 106 can be cooperating servers that are assigned (meaning to own and/or control) a block of internet protocol addresses. One or more of those addresses can be a resolved address that each corresponds to a publicly available or published domain name system (DNS) name for a particular protected server 106 that external clients 108 would use to access the service provided by the protected servers 106. These publicly available address(es), referred to as yellow addresses, are the addresses where a packet of the network traffic arrives by default, such as due to DNS resolution of a published DNS name used as a destination of the packet. Any packet having a destination address included in the IP address block that is not a green address is a yellow address that will be sent to the scrubber 104.

In operation, for each IP address block being protected, router 102 stores one or more selected green addresses and correlates the IP address of the protected server 106 that corresponds to the IP address block to the green address. The selection of the green addresses is performed randomly by applying an algorithm that randomizes the selection. The selected green addresses are not advertised publicly. Furthermore, the green addresses are rotated periodically (by no longer treating the green address as green but rather treating it as yellow) in order that a malicious sender that discovered a green address would not have a working green address for very long.

The router 102 can add a new green address periodically or in response to a trigger event. The green addresses and their respective corresponding IP addresses can be stored in a router table 112 for the IP address block Each green address is associated with the green path 131. In addition, the yellow address(es) for the IP address block can be stored in the router table 112. Each yellow address is associated with the yellow path 133.

The green path 131 and yellow path 133 are fixed. When first configured, the router 102 needs to know (1) a path to the protected servers (meaning the green path 131) and (2) a path to the scrubber (meaning the yellow path 133). "Path" refers to router instructions that describe how to reach a particular device. As green addresses and yellow addresses are updated, mappings of addresses to paths are also updated.

The green path 131 and yellow path 133 can be routes that are provided using, for example, BGP, OpenFlow™, Flowspec, or by configuration of the router 102.

The router 102 monitors all internet traffic packets that have a destination address that is included in an IP address block being monitored. Each packet also includes a source address for the external client 108 that sent the packet. The router 102 receives each packet prior to the scrubber 104 performing DPI on the packet. Upon receiving a packet, router 102 determines whether the destination address in the packet matches any of the green addresses that have been designated for the block of IP addresses that includes the destination address.

When the destination address matches any of the green addresses, then the router 102 sends the packet via the green path 131 to the IP address associated with that green address. The green path 131 does not arrive at the scrubber 104. As previously indicated, the green path 131 can be a direct path from the router 102 to the requested protected server 106 that bypasses any deep packet inspection. The packet that is sent by the router 102 along the green path 131 will not be processed by the scrubber 104 and will not be processed by DPI.

When the destination address does not match the green address, the router 102 sends the packet via the yellow path 133 to the scrubber 104. Thus, if the destination address is the yellow address, the packet is sent to the scrubber 104 for DPI processing. Furthermore, if the destination is an address different from the yellow address and the green address, it is also sent to the scrubber 104 or is dropped.

Upon receiving a packet via the yellow path 133, the scrubber 104 analyzes the packet using DPI. In addition, the scrubber 104 may or may not perform a redirection of the external client 108 indicated by the source address indicated in the packet to one the one or more green addresses, depending on a result of the DPI processing, namely whether or not the packet is authenticated. The redirection redirects all future packets from the external client 108 with a destination address in the IP block to the IP address associated with the green address, bypassing any deep packet inspection. The scrubber 104 further handles the packet based on the result of the DPI processing.

Authentication of the packet includes categorizing, using results of the DPI, the packet and the external client 108 identified by the packet's source address to be authenticated (meaning the packet and its source are determined to be legitimate), illegitimate, or unknown (i.e., not yet known to be authenticated or illegitimate). If determined to be illegitimate, the scrubber 104 drops or quarantines the packet. If determined to be authenticated, the scrubber 104 forwards the packet to the server 106. If determined to be unknown, the scrubber 104 forwards the packet to the server 106 but does not perform a redirection of the external client 108. This will allow the scrubber 104 to inspect future packets from the external client 108 and either make a decision whether the external client 108 is authenticated, illegitimate, or still unknown.

When the scrubber 104 forwards the packet to the server 106, the scrubber 104 can use a pre-established route, such as authenticated path 135. Authenticated path 135 can be a route that is provided using, for example, BOP, OpenFlow™, Flowspec, or by configuration of the scrubber 104.

The scrubber 104 can categorize the packet and/or the external client 108 to be authenticated, illegitimate, or unknown by using, for example and without limitation, a white list, a black list, and/or available heuristics.

Redirection of an external client 108 can be performed as a function of the type of protocol used. For packets sent using HTTP, redirection is a standard part of the protocol. There are standard messages that redirect the client to another URL. The scrubber 104 can perform the redirection by replying to an external client 108 with one of these standard messages, such as "301 Moved" with a "Location" header indicating the green.

In embodiments, such as in a scenario in which there is an objective for the external client 108 to operate as a normally functioning web browser, JavaScript can be injected into a web page provided by a web browser of the external client 108, and when the web browser executes the JavaScript, it is the JavaScript that performs the redirection.

For packets using DNS, redirection can be achieved using standard DNS messages. For example, in response to a request from an external client 108 sends a request for the IP address of a DNS name for the server, such as "www.example.com", the scrubber 104 can send a response that does not contain a direct answer but does say, for example, "the server with that answer is ns1.example.com and its IP address is 198.51.100.5," wherein 198.51.100.5 is the green address.

For packets using session initiation protocol (SIP), redirection is a standard part of the protocol. In response to an INVITE message, the scrubber 104 can perform the redirection by replying with a "302 Moved Temporarily" (or similar 300-level message), with a header that includes the green address.

To avoid usage of the green address by malicious senders, the green address can be rotated periodically. For example, after a first time interval or in response to a trigger event, the scrubber 104 can select a new random IP address from the block of IP addresses to be a new green address and then store the new green address in the router table 112 in association with the IP address of the server.

The new green address can be treated as the currently used green address, and the previously selected green addresses can still be treated as green addresses. After a second interval of time or in response to a second trigger event, the green addresses stored in the router table 112 can be replaced by yellow addresses. Accordingly, traffic to a stale green address (a green address that has been replaced by a yellow address) is sent back to the scrubber 104 for re-authentication. This process effectively causes the associated green address to be treated as a yellow address. In embodiments, the second time interval can be longer than the first time interval. For example and without limitation, the first interval can be 60 seconds, and the second interval can be ten minutes.

Router 102 and scrubber 104 both use the green address(es) that are currently in effect. Router 102 randomly selects the green address(es) and determines whether a packet's destination address matches the green address(es). Scrubber 104 uses the green address(es) for redirecting authenticated external clients 108. Accordingly, there is cooperation between router 102 and scrubber 104. This cooperation indicates that router 102 and scrubber 104 are controlled by the same entity or by different parties that have a principal-agent relationship, are contractually bound to perform the disclosed operations, or are in in a joint enterprise.

Figure 2:
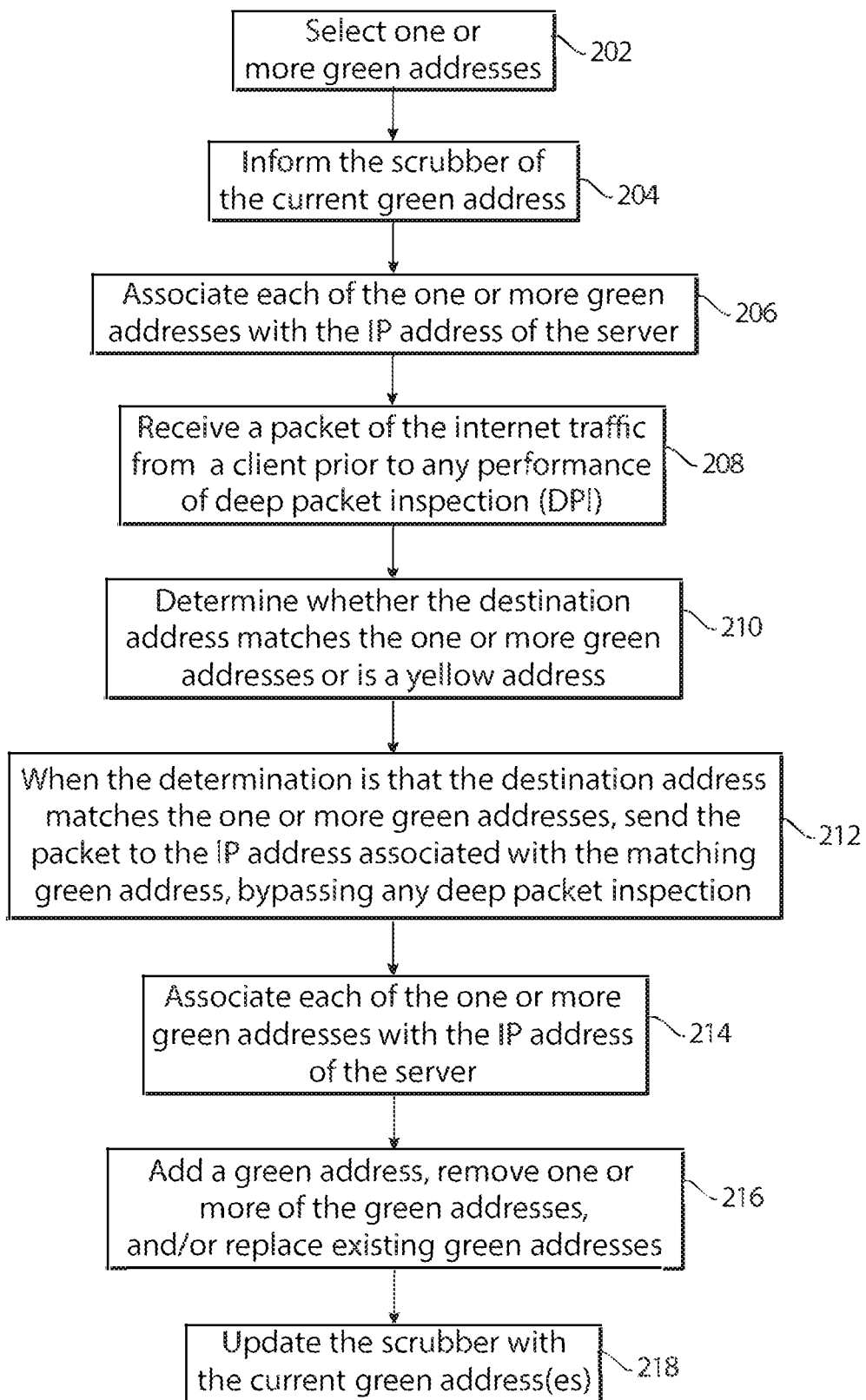
FIG. 2 illustrates a flowchart showing an example method performed by a router of a network monitoring system in accordance with embodiments of the disclosure.
Figure 3:
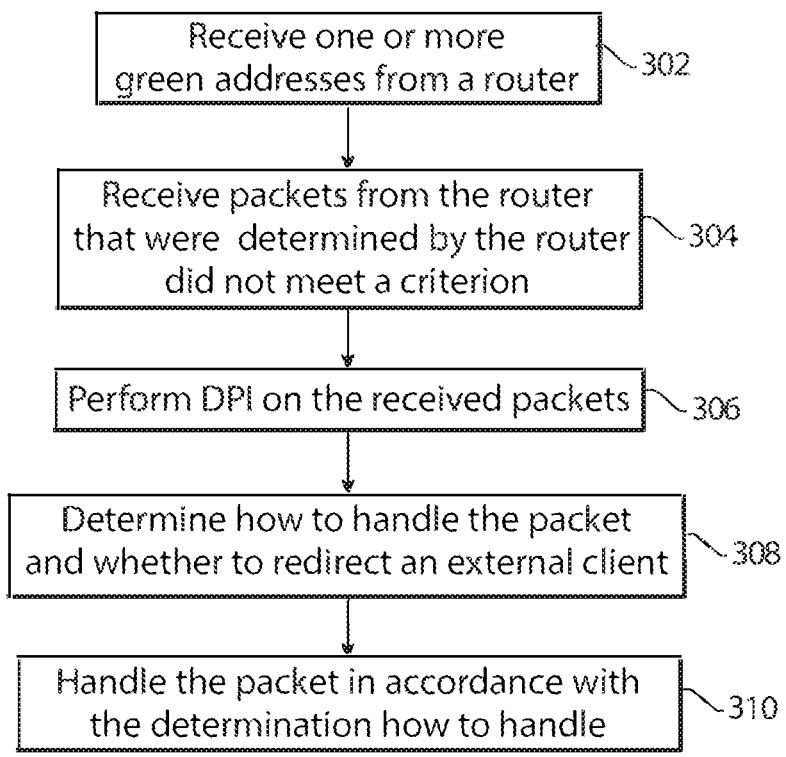
FIG. 3 illustrates a flowchart showing an example method performed by a scrubber of a network monitoring system in accordance with embodiments of the disclosure.
Figure 4:
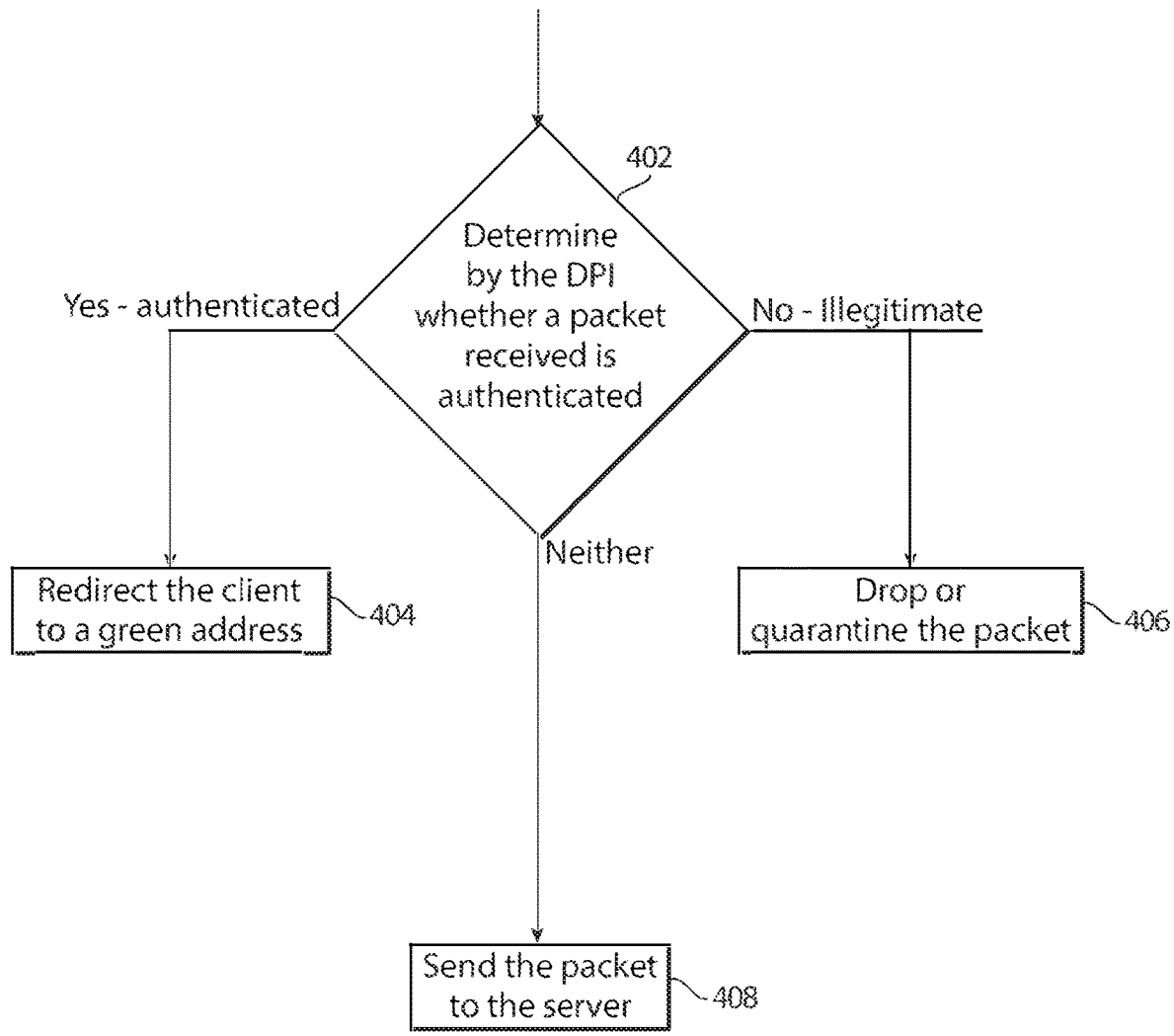
FIG. 4 illustrates a flowchart showing a portion of an example method in greater detail performed by the scrubber in accordance with embodiments of the disclosure.

With reference now to FIGS. 2-4, shown are flowcharts demonstrating implementation of the various exemplary embodiments. It is noted that the order of operations shown in FIGS. 2-4 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 2 illustrates operations of an example method performed by a router, such as router 102 shown in FIG. 1. The router is configured to monitor network traffic for a protected network using a block of internet protocol (IP) addresses that includes an IP address for a server, such as server 106 shown in FIG. 1.

With reference to FIG. 2, operation 202 includes selecting one or more green addresses, wherein each green address is a different IP address from the block of IP addresses. The green addresses can be selected randomly using a randomizer algorithm that randomizes the selection. Operation 204 includes informing the scrubber of the current green address. Operation 206 includes associating each of the one or more green addresses with the IP address of the server. Operation 208 includes receiving a packet of the internet traffic from a client prior to any performance of deep packet inspection (DPI) on the packet in association with monitoring the network traffic for the protected network. The packet including a source address for the client and a destination address from the block of IP addresses.

Operation 210 includes determining whether the destination address matches the one or more green addresses or is a yellow address, wherein the yellow address belongs to the block of IP addresses, but is not a green address.

Operation 212 includes, when the determination is that the destination address matches the one or more green addresses, sending the packet to the IP address associated with the matching green address, bypassing any deep packet inspection.

Operation 214 includes, when the determination is that the destination address does not match the one or more green addresses, sending the packet to a scrubber to analyze and the packet using deep packet inspection and handle the packet and redirection of the client to a green address as a function of a determination made using the DPI.

Operation 216 includes adding a green address, removing one or more of the green addresses, and/or replacing existing green addresses. Operation 216 can be optional, but provides the advantage of thwarting determination of the green address by an unwanted device, such as a device that acts maliciously, by guessing or discovery. Operation 218 includes updating the scrubber with the current green address(es).

FIG. 3 illustrates operations of an example method performed by a scrubber, such as scrubber 104 shown in FIG. 1. With reference to FIG. 3, operation 302 includes receiving one or more green addresses from a router that receives all traffic directed to a block of IP addresses, wherein the green address(es) can be randomly selected.

Operation 304 includes receiving packets from the router that were determined by the router did not meet a criterion. The criterion is the destination address matches the one or more green addresses. Operation 306 includes performing DPI on the received packets. Operation 308 includes determining how to handle the packet and whether to redirect an external client (such as external client 108, shown in FIG. 1), as a function of a determination made using the DPI. At operation 310, handle the packet and redirection in accordance with the determination.

FIG. 4 shows an example method performed by a scrubber, such as scrubber 104 shown in FIG. 1, for performing operations 308 and 310 of FIG. 3. Operation 402 includes determining by the DPI whether a packet received is authenticated. When the determination by operation 402 is that the packet is authenticated, the method continues at operation 404. Operation 404 includes redirecting the external client to a green address. When the determination by operation 402 is that the packet is an illegitimate packet, the method continues at operation 406. Operation 406 includes dropping or quarantining the packet. When it is undetermined at operation 402 whether the packet is authenticated or illegitimate, the method continues at operation 408. Operation 408 includes sending the packet to the server, but does not include redirecting the external client.

Accordingly, network traffic to a server having an IP address in a block of IP addresses can be monitored by the disclosed monitoring system. Once a packet of the network traffic has been authenticated using DPI as being legitimate traffic, the client that sent the packet can be directed so that future traffic from the client can be sent directly to the server, bypassing DPI, using fewer resources and incurring less latency relative to a monitoring method in which all traffic undergoes DPI.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments processing performed by the router 102 and/or scrubber 104 router 102 and/or scrubber 104 may be implemented or executed by one or more computer systems. For example, processing performed by the router 102 and/or scrubber 104 can be implemented using a computer system such as example computer system 502 illustrated in FIG. 5. In various embodiments, computer system 502 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 502 is only one example of a suitable system and is not intended to suggest any limitation as to the scope of use or functionality of embodiments of the disclosure described herein. Regardless, computer system 502 is capable of being implemented and/or performing any of the functionality set forth hereinabove.

Computer system 502 may be described in the general context of computer system-executable instructions, such as program modules, being executed by a computer system. Generally, program modules may include routines, programs, objects, components, logic, data structures, and so on that perform particular tasks or implement particular abstract data types. Computer system 502 may be practiced in distributed data processing environments where tasks are performed by remote processing devices that are linked through a communications network. In a distributed data processing environment, program modules may be located in both local and remote computer system storage media including memory storage devices.

Figure 5:
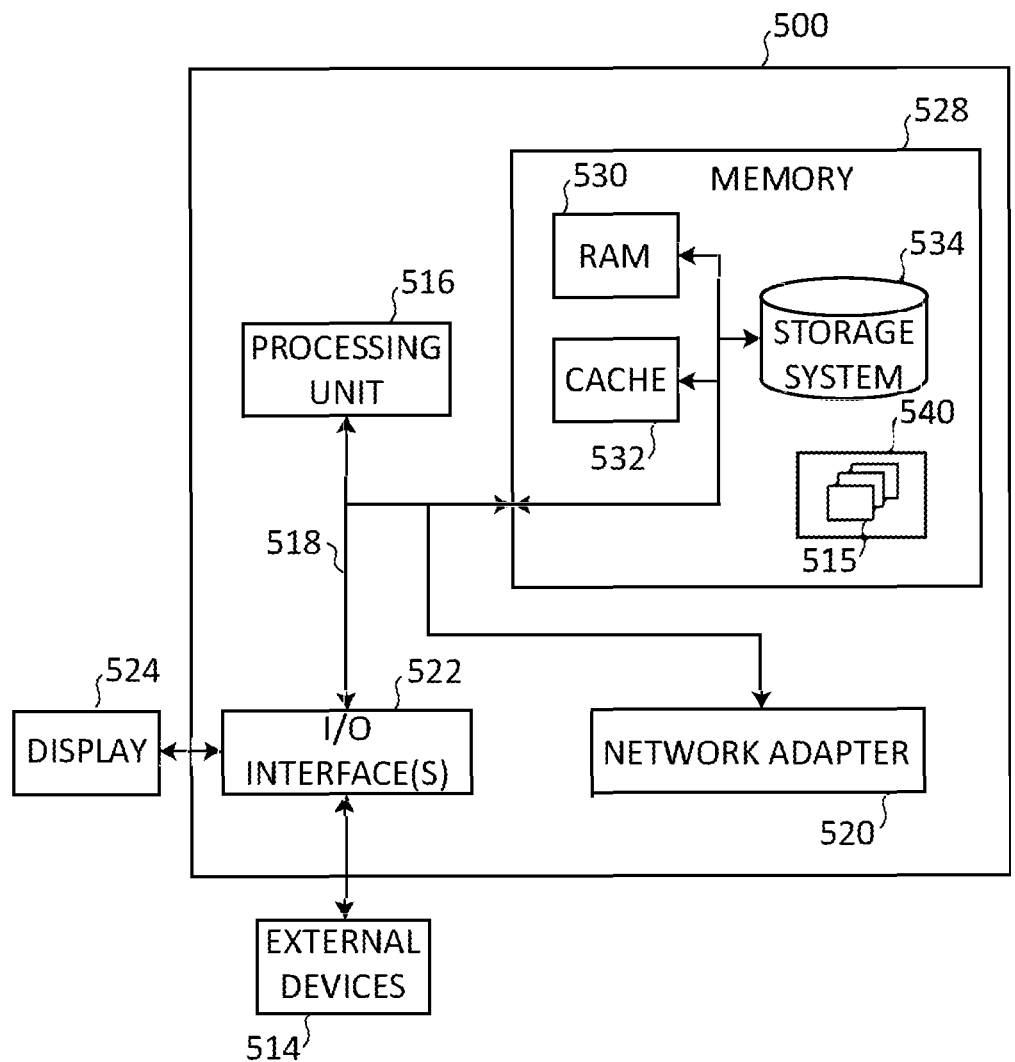
FIG. 5 illustrates a block diagram of an example computer system for implementing the router and/or scrubber of the network monitoring system of FIG. 1 in accordance with an illustrative embodiment of the present disclosure.

Computer system 502 is shown in FIG. 5 in the form of a general-purpose computing device. The components of computer system 502 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 502 typically includes a variety of computer system readable media. Such media may be any available media that is accessible by the router 102 and/or scrubber 104, and it includes both volatile and non-volatile media, removable and non-removable media.

System memory 528 can include computer system readable media in the form of volatile memory, such as random access memory (RAM) 530 and/or cache memory 532. Computer system 502 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected lo bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515 may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 502 may also communicate with one or more external devices 514 such as a keyboard, a pointing device, a display 524, etc.; one or more devices that enable a user to interact with computer system 502; and/or any devices (e.g., network card, modem, etc.) that enable the router 102 and/or scrubber 104 to communicate with one or more other computing devices. Such communication can occur via Input/Output (I/O) interfaces 522. Still yet, computer system 502 can communicate with one or more networks such as a local area network (LAN), a general wide area network (WAN), and/or a public network (e.g., the Internet) via network adapter 520. As depicted, network adapter 520 communicates with the other components of the router 102 and/or scrubber 104 via bus 518. It should be understood that although not shown, other hardware and/or software components could be used in conjunction with computer system 502. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method and system include the ability to administer test sessions across selected distributed monitor devices that are configured to emulate selectable user actions directed at a selected server and perform a variety of selectable proxy-based tests, allowing for testing and analysis of end-to-end performance. Since the test session storage, test session selection, and analysis of the intercept data is performed on a resource intense platform, instead of by the resource restricted monitor devices, complicated analysis can be performed that requires more resources than are available on the monitor devices. Testing of a service provided by a server can include testing aspects that rely on multiple external dependencies. Additionally, the test sessions can be selected from a large selection of test sessions that test a large array of services, protocols, and aspects of services.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of monitoring network traffic for a protected network using a block of internet protocol (IP) addresses assigned to one or more protected servers, the method comprising:
   selecting one or more green addresses, wherein each green address is a different IP address from the block of IP addresses and corresponds to a fixed green path that provides a route to the one or more protected servers;
   receiving a first packet of the network traffic from a client directed to an IP address of the block of IP addresses, the first packet including a source address for the client and a destination address from the block of IP addresses, wherein the first packet is received prior to any performance of deep packet inspection on the first packet in association with monitoring the network traffic for the protected network;
   responsive to determining that the destination address matches the one or more green addresses, transmitting the first packet to the one or more protected servers via the fixed green path, bypassing any deep packet inspection;
   receiving a second packet of the network traffic subsequent to receiving the first packet of the network traffic; and
   responsive to determining a time interval has ended or responsive to detecting a trigger event, transmitting the second packet to a scrubber instead of transmitting the second packet via the green path despite determining a destination IP address of the second packet matches the one or more green addresses, wherein the scrubber is configured to analyze the second packet using deep packet inspection.

2. The method of claim 1, further comprising:
   receiving a third packet of the network traffic;
   determining a source address of the third packet is illegitimate; and
   responsive to the determining the source address is illegitimate, transmitting the third packet to the scrubber to be dropped or quarantined.

3. The method of claim 1, further comprising:
   transmitting the second packet to the one or more protected servers via the green path based on a lack of a determination by the deep packet inspection of the second packet that the source address is illegitimate or authenticated, without redirecting the second packet to the client, such that any subsequent requests from the client will be sent to the scrubber to be analyzed using deep packet inspection.

4. The method of claim 1, further comprising:
   selecting a new green address instead of or in addition to the one or more green addresses by:
      selecting a new random IP address from the block of IP addresses to be a new green address of the one or more green addresses; and
      associating the new green address with the green path.

5. The method of claim 4, wherein selecting the new green address is performed periodically after a second time interval or in response to a second trigger event.

6. The method of claim 1, wherein transmitting the second packet to the scrubber despite determining the destination IP address of the second packet matches the one or more green addresses comprises transmitting the second packet to the scrubber responsive to determining the time interval has ended.

7. The method of claim 1, further comprising:
   receiving a third packet;
   determining a destination address of the third packet is of the block of IP addresses but is not a green address;
   responsive to the determining the destination address of the third packet is not a green address, transmitting the third packet to the scrubber.

8. The method of claim 1, wherein selecting the one or more green addresses includes randomly selecting the one or more green addresses.

9. The method of claim 1, further comprising:
   adjusting a green address of the selected one or more green addresses to be treated as a yellow address;

receiving a third packet, a destination address of the third packet matching the adjusted green address; and transmitting the third packet to the scrubber based on the adjusted green address.

10. The method of claim 1, wherein receiving the first packet and the second packet comprises receiving the first packet and the second packet using an IPv6 protocol.

11. A system for monitoring network traffic for a protected network using a block of internet protocol (IP) addresses assigned to one or more protected servers, the system comprising:

one or more processors coupled with memory and configured to:

select one or more green addresses, wherein each green address is a different IP address from the block of IP addresses and corresponds to a fixed green path that provides a route to the one or more protected servers;

receive a first packet of the network traffic from a client directed to an IP address of the block of IP addresses, the first packet including a source address for the client and a destination address from the block of IP addresses, wherein the first packet is received prior to any performance of deep packet inspection on the first packet in association with monitoring the network traffic for the protected network;

responsive to determining that the destination address matches the one or more green addresses, transmit the first packet to the one or more protected servers via the fixed green path, bypassing any deep packet inspection;

receive a second packet of the network traffic subsequent to receiving the first packet of the network traffic; and responsive to determining a time interval has ended or responsive to detecting a trigger event, transmit the second packet to a scrubber instead of transmitting the second packet via the green path despite determining a destination IP address of the second packet matches the one or more green addresses, wherein the scrubber is configured to analyze the second packet using deep packet inspection.

12. The system of claim 11, wherein the one or more processors are further configured to:

receive a third packet of the network traffic;

determine a source address of the third packet is illegitimate; and responsive to the determining the source address is illegitimate, transmit the third packet to the scrubber to be dropped or quarantined.

13. The system of claim 11, wherein the one or more processors are further configured to:

transmit the second packet to the one or more protected servers via the green path based on a lack of a determination by the deep packet inspection of the second packet that the source address is illegitimate or authenticated, without redirecting the second packet to the client, such that any subsequent requests from the client will be sent to the scrubber to be analyzed using deep packet inspection.

14. The system of claim 11, wherein the one or more processors are further configured to:

select a new green address instead of or in addition to the one or more green addresses by:

selecting a new random IP address from the block of IP addresses to be a new green address of the one or more green addresses; and associating the new green address with the green path.

15. The system of claim 14, wherein the one or more processors are configured to select the new green address periodically after a second time interval or in response to a second trigger event.

16. The system of claim 11, wherein the one or more processors are configured to transmit the second packet to the scrubber despite determining the destination IP address of the second packet matches the one or more green addresses by transmitting the second packet to the scrubber responsive to determining the time interval has ended.

17. The system of claim 11, wherein the one or more processors are further configured to:

receive a third packet;

determine a destination address of the third packet is of the block of IP addresses but is not a green address;

responsive to the determination that the destination address of the third packet is not a green address, transmit the third packet to the scrubber.

18. A non-transitory computer-readable storage medium storing executable instructions that, when executed by one or more processors, cause the one or more processors to monitor network traffic for a protected network using a block of internet protocol (IP) addresses assigned to one or more protected servers, the instructions causing the one or more processors to:

select one or more green addresses, wherein each green address is a different IP address from the block of IP addresses and corresponds to a fixed green path that provides a route to the one or more protected servers;

receive a first packet of the network traffic from a client directed to an IP address of the block of IP addresses, the first packet including a source address for the client and a destination address from the block of IP addresses, wherein the first packet is received prior to any performance of deep packet inspection on the first packet in association with monitoring the network traffic for the protected network;

responsive to determining that the destination address matches the one or more green addresses, transmit the first packet to the one or more protected servers via the fixed green path, bypassing any deep packet inspection;

receive a second packet of the network traffic subsequent to receiving the first packet of the network traffic; and responsive to determining a time interval has ended or responsive to detecting a trigger event, transmit the second packet to a scrubber instead of transmitting the second packet via the green path despite determining a destination IP address of the second packet matches the one or more green addresses, wherein the scrubber is configured to analyze the second packet using deep packet inspection.

19. The non-transitory computer-readable storage medium of claim 18, the instructions further causing the one or more processors to:

receive a third packet of the network traffic;

determine a source address of the third packet is illegitimate; and responsive to the determination that the source address is illegitimate, transmit the third packet to the scrubber to be dropped or quarantined.

20. The non-transitory computer-readable storage medium of claim 18, the instructions further causing the one or more processors to:

transmit the second packet to the one or more protected servers via the green path based on a lack of a determination by the deep packet inspection of the second packet that the source address is illegitimate or authenticated, without redirecting the second packet to the client, such that any subsequent requests from the client will be sent to the scrubber to be analyzed using deep packet inspection.

* * * * *